United States Patent [19]

White

[11] 3,937,600
[45] Feb. 10, 1976

[54] CONTROLLED STROKE ELECTRODYNAMIC LINEAR COMPRESSOR
[75] Inventor: Harlan V. White, Scotia, N.Y.
[73] Assignee: Mechanical Technology Incorporated, Latham, N.Y.
[22] Filed: May 8, 1974
[21] Appl. No.: 467,848

[52] U.S. Cl. .................. 417/416; 310/27; 417/418
[51] Int. Cl.² ........................................ F04B 35/04
[58] Field of Search .................. 417/418, 417, 416; 290/1 R; 310/27, 30; 92/8, 10, 85

[56] References Cited
UNITED STATES PATENTS
2,721,453  10/1955  Reutter .............................. 417/418
2,988,264  6/1961   Reutter .............................. 417/418

FOREIGN PATENTS OR APPLICATIONS
834,125  3/1952  Germany .......................... 417/418

Primary Examiner—John J. Vrablik
Assistant Examiner—O. T. Sessions
Attorney, Agent, or Firm—Joseph V. Claeys; Charles W. Helzer

[57] ABSTRACT

A compressor of the resonant type driven by an electrodynamic linear motor incorporates means to control the stroke and to improve the power factor. The spring-mass system of the compressor which is forced into vibration by the motor is arranged to have a selectively variable resonant frequency generally centered on the power line frequency. Means responsive to any overstroking are operative to vary the natural frequency of the spring-mass system, for example by varying the stiffness of the spring means, so as to oppose further overstroking and maintain a high power factor.

5 Claims, 14 Drawing Figures

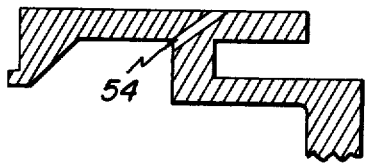
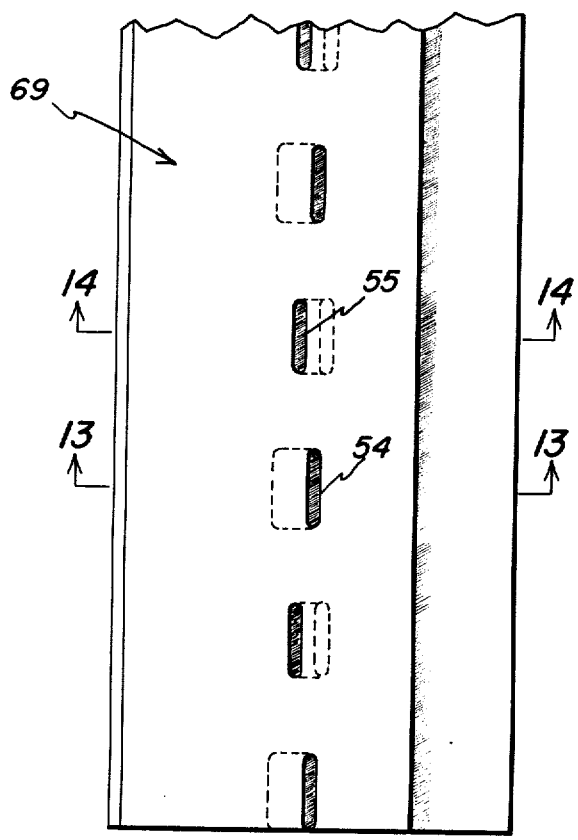
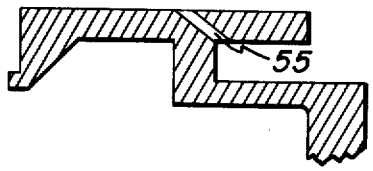
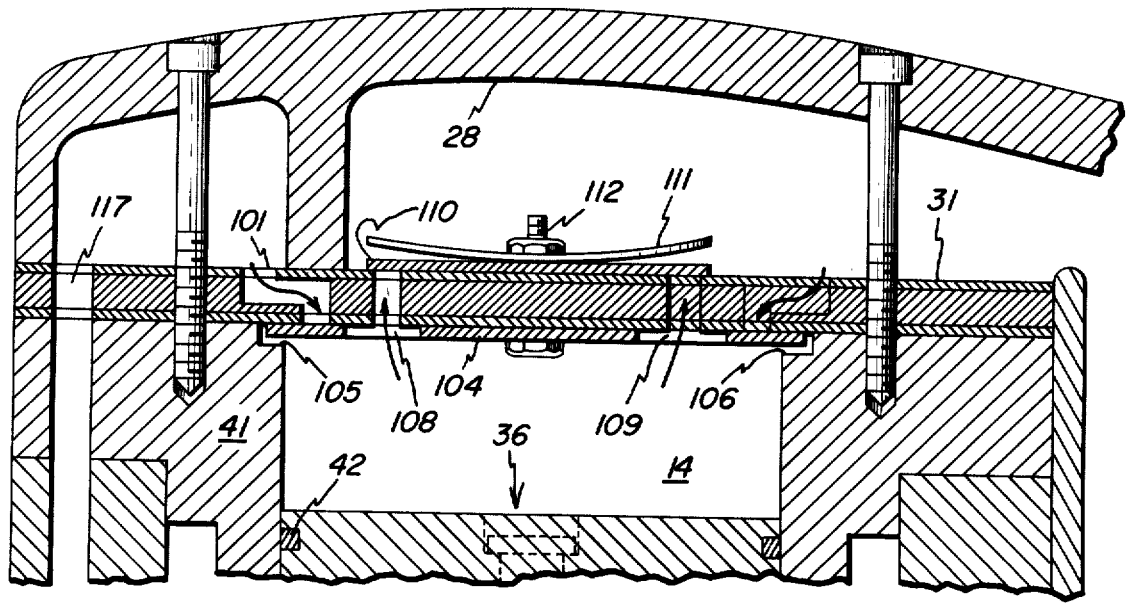

CONTROLLED STROKE ELECTRODYNAMIC LINEAR COMPRESSOR

BACKGROUND OF THE INVENTION

1. Field of the Invention

The present invention relates in general to resonant compressors and more particularly to resonant compressors driven by electrodynamic linear motors. The invention has a wide range of applications, one example of which is use in refrigeration and air conditioning equipment and it will be described in detail in a configuration of that type.

2. Description of the Prior Art

Compressors employing electromagnetic drive means have long been known in the art; the use of electrodynamic drive means being a more recent development. Heretofore, resonant type compressors driven by electrodynamic linear motors have been limited by the requirements that they operate into a relatively constant load, and that the power source be stable, especially with respect to voltage and frequency. Perturbations in these parameters lead to overstroking. Much effort has been applied to this problem. Early attempts involved the use of complex control means which, while they could prevent overstroking, did not solve the underlying problem. The more recent use of springs of various types which increased in stiffness towards the end of a stroke were brute force cures of the symptoms along the same line.

I have discovered that the uncompensated combination of an electrodynamic linear motor with a resonant compressor is only conditionally stable, that is, that instabilities in supply voltage or in load will cause overstroking.

Accordingly, it is an object of this invention to provide a new and improved electrodynamic linear motor, resonant type compressor which overcomes one or more of the limitations of prior art type compressors and which is inexpensive and simple to manufacture.

It is another object of this invention to provide a new and improved electrodynamic linear motor, resonant type compressor system having a higher power factor than was heretofore possible without the use of power factor correction capacitors.

It is another object of this invention to provide a new and improved electrodynamic linear motor, resonant type compressor having a higher output under a wide range of load conditions than was heretofore possible.

It is still another object of this invention to provide a new and improved electrodynamic linear motor, resonant type compressor having an inherent stability and being relatively insensitive to variations in line voltage and in load.

It is another object of this invention to provide a new and improved electrodynamic linear motor, resonant type compressor having compensating means to oppose overstroking and prevent piston strike.

SUMMARY OF THE INVENTION

Briefly stated, in accordance with one aspect of this invention a new and improved compressor comprises a fluid displacing member arranged to be reciprocally driven by the armature of an electrodynamic linear motor. The motor armature and fluid displacing member are operatively associated with resilient means which may be a gas spring to provide a resonant mechanical system. Means selectively responsive to overstroking are provided which increase the resonant frequency of the resonant mechanical system, as for example, by increasing the stiffness of the resilient means, so as to oppose further overstroking and improve power factor.

BRIEF DESCRIPTION OF THE DRAWINGS

The novel features believed characteristic of this invention are set forth with particularity in the appended claims. The invention itself, however, both as to its organization and method of operation together with further objects and advantages thereof may best be understood by reference to the following description taken in conjunction with the accompanying drawings and in which:

FIG. 5 is a developed view of one piston;

FIG. 6 is a section view of the valve plate and associated cylinder head manifold used in one embodiment of the invention;

FIG. 13 is a section of FIG. 5 showing one type of port; and,

FIG. 14 is a section of FIG. 5 showing the other type of port.

DESCRIPTION OF THE PREFERRED EMBODIMENT

Figure 1:
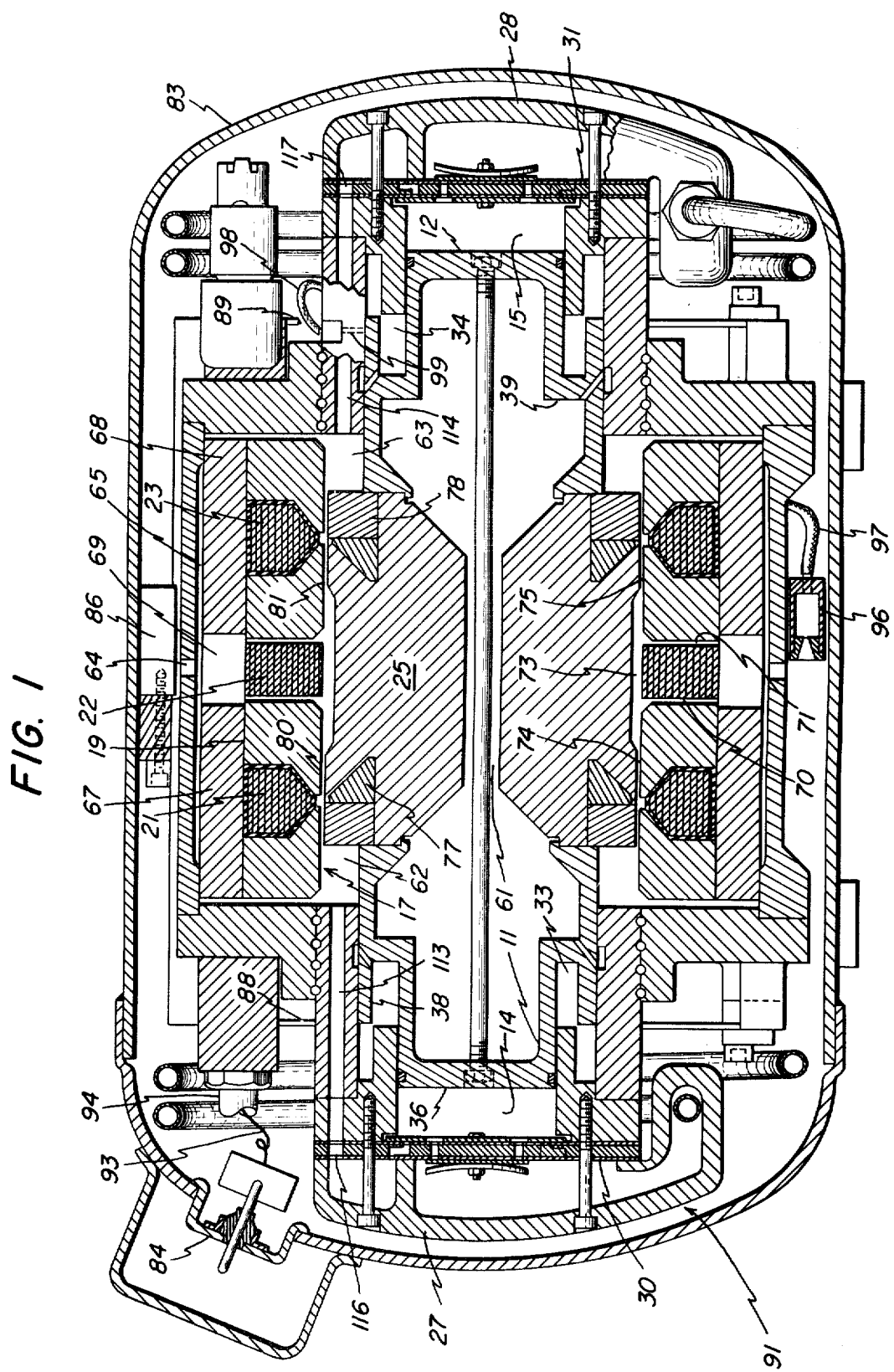
FIG. 1 is a section view of a resonant piston compressor in accordance with one aspect of this invention.

In FIG. 1 there is illustrated a resonant compressor constructed in accordance with one embodiment of this invention. As shown, the compressor includes a pair of oppositely directed pistons 11 and 12, each comprising a radially spaced apart working plunger 36 and gas spring plunger 38 (numbered on piston 11 only). Working plungers 36 of pistons 11 and 12 are disposed within respective working cylinders 14 and 15 and gas spring plungers 38 are disposed in respective cylinders 33. Pistons 11 and 12 are arranged to be reciprocally driven by a suitable electrodynamic linear motor generally at 17.

Preferably, motor 17 is a new and improved electrodynamic linear motor of the type disclosed and claimed in the copending patent application of Herbert C. Roters, Ser. No. 365,584, now U.S. Pat. No. 3,891,874, filed May 31, 1973, and assigned to the same assignee as the present invention, and the contents of which are incorporated herein by reference.

Motor 17 has a stator 19 having coils 21, 22 and 23, and an armature 25 mounted within the stator. Coils 21 and 23 are adapted to be connected to a suitable source of alternating current and coil 22 to a suitable source of direct current. When the coils are energized they effect axial reciprocation of the armature 25 in synchronism with the frequency of the alternating current source and short-circuited coils 77 are provided in the poles of armature 25 as described more fully in the foregoing copending application.

Figure 2:
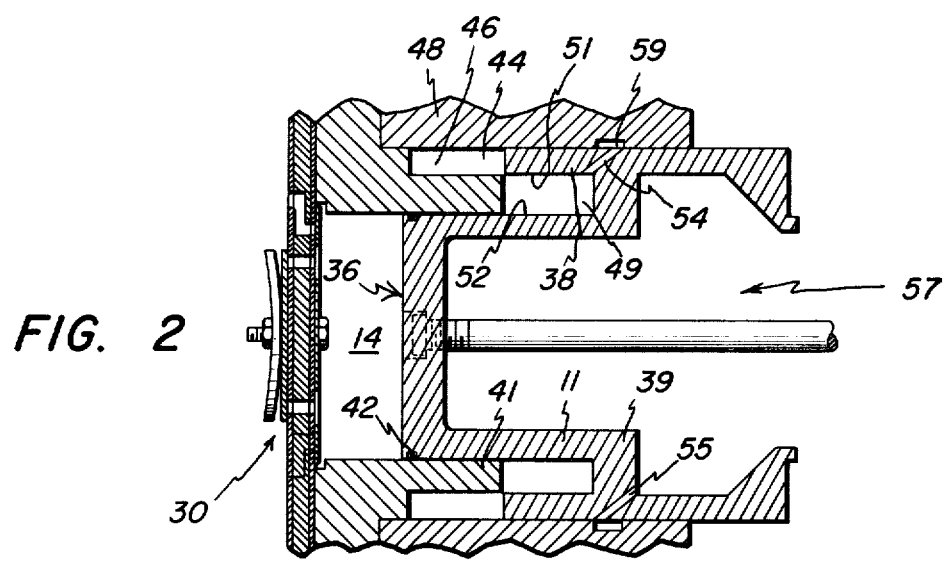
FIG. 2 is a detailed sectional view of one cylinder of the compressor along with the associated piston in a midstroke porting relationship.
Figure 4:
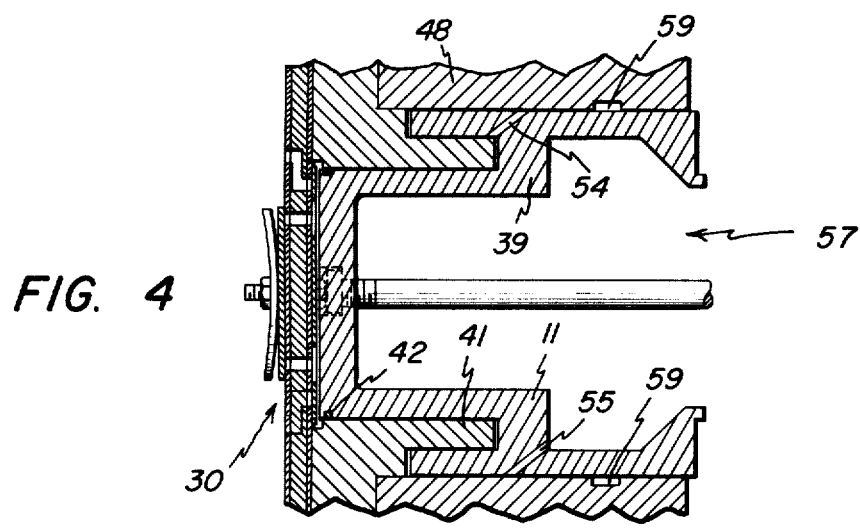
FIG. 4 is yet another detailed sectional view of one cylinder of compressor in fully stroked relationships.
Figure 3:
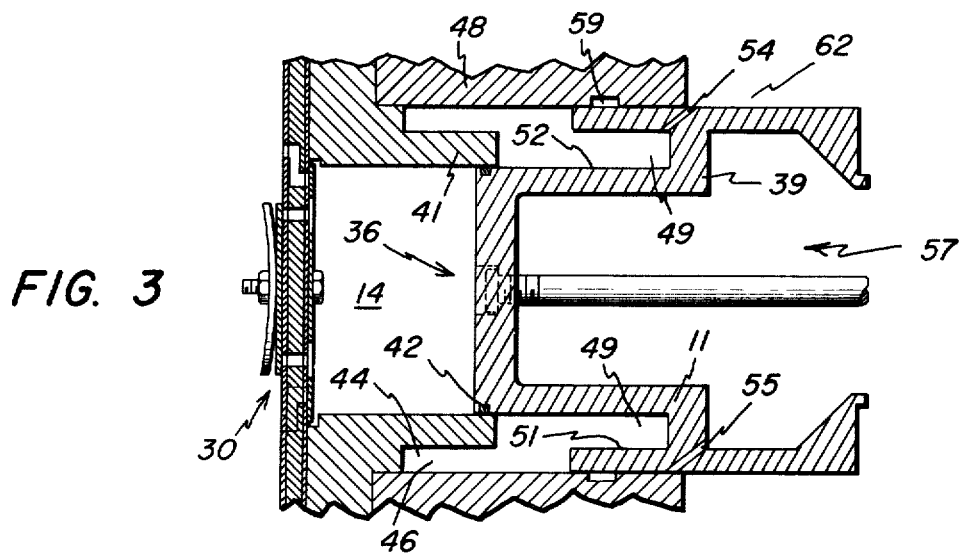
FIG. 3 is another detailed sectional view of one cylinder of the compressor along with the associated piston in an end of stroke porting relationship.

Referring now to FIGS. 2, 3 and 4, piston 11 and its associated cylinders are shown in fragmentary enlarged views of the midstroke and the two extreme end of stroke relationships to illustrate the porting functions occurring at those positions. The piston 11 comprises two portions defining a working plunger 36 and a gas spring plunger 38 connected to the working plunger by annular member 39. The working plunger is slidably reciprocal in working cylinder 14 defined by annular working cylinder wall member 41 and valve plate 30. Piston ring 42 insures an efficient seal. The gas spring cylinder 33 comprises two chambers, a first chamber 44 defined by L shaped annular recess 46 in working cylinder wall member 41 and gas spring cylinder wall member 48, and a second chamber 49 defined by the inside wall 51 of gas spring plunger 38, and the outside wall 52 of working plunger 36. Gas spring plunger 38 reciprocates in the first chamber 44 and working cylinder wall member 41 reciprocates in the second chamber 49. From the foregoing it will be observed that the second chamber 49 moves while the cylinder wall member 48 which acts as the plunger, is stationary.

In accordance with this invention means are provided for selectively adjusting the stiffness of the gas spring to raise the natural frequency of the system upon overstroking and thus compensate therefore through interaction of the mechanical and electrical phase relationships as will be more fully described below. In the compressor illustrated, the piston is provided with a plurality of circumferentially spaced apart ports 54 and 55 extending through the gas spring cylinder wall member 48 which communicate the gas spring cavities 44 and 49 with the interior 57 of the hollow piston 11 when the piston is at the midstroke position of its cycle, as shown in FIG. 2. Two configurations of ports cooperate to achieve this communication. The first type as mentioned are circumferentially spaced apart ports 54 extending from the gas spring cavity 49 through the piston wall to a circumferential groove 59 in the wall of the cylinder 48. The second type are similar ports 55 displaced in a direction towards the electrodynamic linear motor armature center from the first type and extending from the interior 57 of hollow piston 11 through the piston wall 38 to the circumferential groove 59. The displacement is such that the two types of ports simultaneously align their piston wall ends with the circumferential groove 59 at midstroke whereby the gas spring cylinder is communicated through the first ports 54, and then through the second ports 55 to the interior of hollow piston 11. Identical porting of the second piston 12 (not shown) permits communications between the opposing gas spring cylinders through armature bore 61 (see FIG. 1) thus equalizing the pressures in the opposing gas spring cylinders at midstroke.

The overstroking compensation of the invention may best be understood by referring now to FIG. 3 wherein the assembly of FIG. 2 is shown in a position wherein the piston is most fully withdrawn from the cylinder, at bottom dead center. In that position the ports 55, which in the midstroke position communicated the interior of the hollow piston 57 with the circumferential groove 59, are blocked by the cylinder wall. The ports 54 which communicate the gas spring cavity 49 with the wall of piston 11 however are effective in this overstroked position to admit fluid at ambient pressure to the gas spring cylinder 49 from the annular region 62 (FIG. 1) which contains pressurized fluid.

The operating conditions of the compressor are such that the gas spring pressure is lower than ambient at the bottom dead center (overstroked condition) for all design conditions. Accordingly, fluid flows into the gas spring cylinder 49 from the ambient environment 62, while the piston 11 is at bottom dead center, so that upon subsequent midstroke porting the stiffness of the system is increased.

Referring now to FIG. 4 the piston 11 is shown in the position of maximum penetration into the cylinder 14, as would occur due to a perturbation in line voltage for example. The ports 54 and 55 are both blocked by cylinder wall member 48, and there is no communication between cylinders. The opposing piston 12 is in the relationship described in FIG. 3, and the pressure in its gas spring cylinder has increased as was described. When the instant piston 11 subsequently reaches the midstroke relationship, the gas spring cylinders 33 and 34 will communicate through the means hereinbefore described, and the stiffness of the gas springs will equalize at a value higher than previously, thus raising the resonant frequency of the spring mass system to oppose further overstroking in the manner which will be described below. If the perturbation was momentary and does not reoccur, normal leakage along the gas spring walls tends to reduce the pressure in the gas spring cylinders to its previous value. Should the perturbation continue, the pressure in the gas spring cylinders will continue to increase, further increasing the resonant frequency of the system until a normal stroke length is obtained through phase changes in the mechanical and electrical relationships as will be described.

Referring now to FIG. 5 an unwrapped or developed view of the piston is shown wherein the two types of ports 54 and 55 can be seen in more detail. In the arrangement illustrated, ports of a generally oval configuration are inclined in opposite directions. For example, ports 54 are inclined toward the left in FIG. 5 while ports 55 are inclined to the right therein. Conveniently, one fourth of the circumference of the piston is comprised of such ports. The shape of the ports will determine the rate of flow of fluid into the cylinders. In the configuration illustrated, the ports become effective rapidly during a stroke, that is, a large effective opening is perpendicular to the direction of piston travel. Different port shapes will provide more gradual transitions from a blocked port to an effective port condition. Exponentially-shaped ports have been found to produce an especially smooth porting action, but they are more difficult to manufacture.

While any suitable support and housing means may be used in conjunction with the invention I have found the form illustrated in FIG. 1 to be convenient wherein a generally symmetrical housing 83 contains the compressor. A feedthrough bushing 84 provides a path for power to be supplied to electrodynamic linear motor 17 which is mounted to the housing 83 by means of bracket 86 and supporting straps 88 and 89 which allow a limited freedom of movement of the compressor 91 with respect to the housing 83 for the suppression of vibration and noise transmission.

Power is supplied to the electrodynamic linear motor through flexible wire connections 93 to the motor terminals 94.

To provide for lubrication of the sliding surfaces especially the piston and cylinder walls a pump 96 is provided. Conveniently, a differential orifice pump may be utilized to take advantage of the natural vibration of the compressor. Lubricant is pumped through means such as flexible tubing 97 from the bottom of the housing to nozzel 98 where it is applied to the relatively moving surfaces through passages 99.

Conveniently the uncompressed fluid which fills the housing 83 during operation may be utilized to provide cooling for the electrodynamic linear motor. Circumferentially spaced apart bores 64 are provided to communicate the interior of housing 83 with annular cavity 65 which surrounds the stator 19. Passages 69 created in the space between partial stator laminations 67 and 68 at selected intervals, communicate annular cavity 65 with passages 70 and 71 (numbered at bottom) on either side of coil 22 to cool coil 22. Passages 70 and 71 communicate with second irregularly-shaped annular cavity 73 which surrounds electrodynamic linear motor armature 25. Annular gaps 74 and 75 between armature poles 77 and 78 and stator poles 80 and 81 respectively communicate second annular cavity 73 with annular cavities 62 and 63. Annular cavities 62 and 63 provide the reservoir of fluid for the porting functions described, and additionally communicate with manifold-cylinder heads 27 and 28 through bores 113 and 114 and valve plate bores 116 and 117.

FIG. 6 is an enlarged fragmentary view showing the valve means and compressor intake and discharge passages. As shown, fluid enters the working cylinder 14 through passage 101 when intake valve leaf 104 is opened. Valve leaf 104 is restricted in its travel by stops 105 and 106 in working cylinder wall member 41. Pressurized fluid is exhausted from working cylinder 14 through passage 108 and 109 past exhaust valve leaf 110 which is restricted in its movement by rigid restricted member 111. Restraining member 111 exhaust leaf 110 and intake leaf 104 are anchored to the valve plate by suitable means as for example bolt 112.

PRINCIPLES OF OPERATION

Having described a specific embodiment of the invention, a description of the principles upon which the operation of the invention depends will be given to enable a clear understanding of the novel concepts involved.

Figure 7:
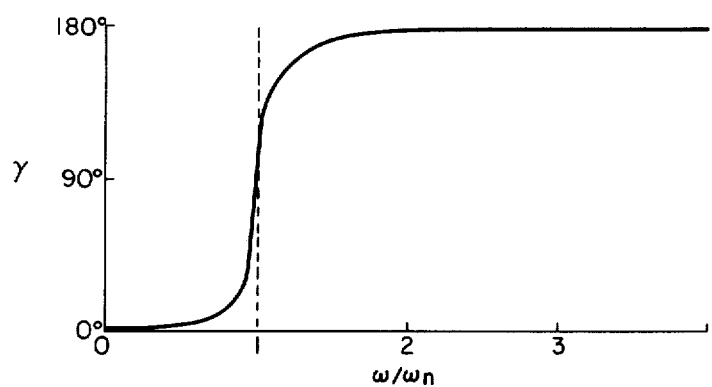
FIG. 7 is a graphical representation of the relationship between the angle through which the displacement lags the driving force and the ratio of the natural frequency to the driving force frequency.

The combination of the mass of the electrodynamic linear motor piston assembly with the spring characteristics of the working cylinder and gas spring forms a conventional spring-mass oscillating system. FIG. 7 shows the relationship between the angle ($\gamma$) through which the displacement lags the driving force, and the ratio of the natural frequency ($wn$) to the driving force frequency ($w$).

When the driving force frequency is equal to the natural frequency, $w/wn$ equals 1 and the system is said to be resonant. At this point the displacement lags the driving force by 90°. Ignoring for a moment any damping forces, the displacement of such a spring mass system is described by the equation:

$$x = X \sin w\, t,$$

where $x$ is the displacement, $X$ is the stroke, $w$ is the angular velocity and $t$ is the time.

The velocity ($v$) is described by:

$$v = w\, X \cos w\, t.$$

Figure 8:
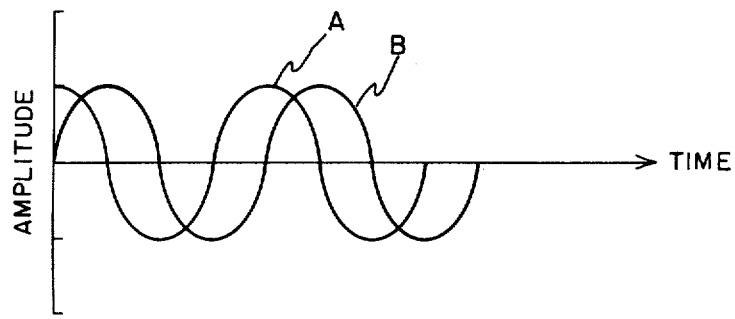
FIG. 8 is a graphical representation of the displacement and velocity of a driven mass spring resonant system with respect to time.

Referring now to FIG. 8 where displacement and velocity are plotted with respect to time it can be seen that velocity A leads displacement B by 90°.

Recalling that at resonance, when $w/wn = 1$, the displacement lags the driving force by 90°, it can be seen that the velocity and the driving force are in phase at resonance.

At resonance, absent any overriding considerations, the amplitude of oscillation will be maximized, diminishing rapidly as the driving force frequency deviates from the design natural frequency.

In accordance with one aspect of the present invention, the spring portion of the mass-spring resonant system comprises two elements: a working cylinder, and a gas spring cylinder. There is an important distinction between mechanical springs and gas springs formed by valved cylinders. Mechanical springs provide an increasing restoring force directly proportional to displacement. A valved cylinder has a stiffness K expressed as:

$$K = Force/Amplitude$$

During compression, but before valve opening, the force which is proportional to the pressure multiplied by the area of the piston, increases non-linearly as the amplitude increases. When the pressure has increased to the point of valve opening, it ceases to increase and remains constant. Since the amplitude continues to increase, the stiffness decreases, and the natural frequency of the spring mass system is reduced.

In order to completely understand the operation of the present invention we now consider the characteristics of the electrodynamic linear motor.

The driving force of an electrodynamic linear motor is proportional to the current drawn by it. To determine this current it is convenient to consider the various voltages associated with the electrodynamic linear motor, and the phase relationships among them.

The line voltage is a constant. It is the vector sum of three component voltages, a first voltage which is the product of the current supplied and the resistance of the motor windings, a second voltage which is the product of the current supplied and the inductive reactance of the motor windings, and a third load voltage created by the linking and unlinking of the coils by the magnetic flux circulating in the motor.

The third voltage, hereinafter called the load voltage, is necessarily in phase with the velocity of the electrodynamic linear motor armature. The driving force applied to the armature is created by and is phased with the current supplied to the motor AC coils.

It can be seen therefore that angle in the mechanical system through which the velocity lags the driving force is identical to the angle in the electrical system through which the load voltage lags the current. It is this relationship which allows the system to be operated in a stable mode as will now be described.

Figure 9:
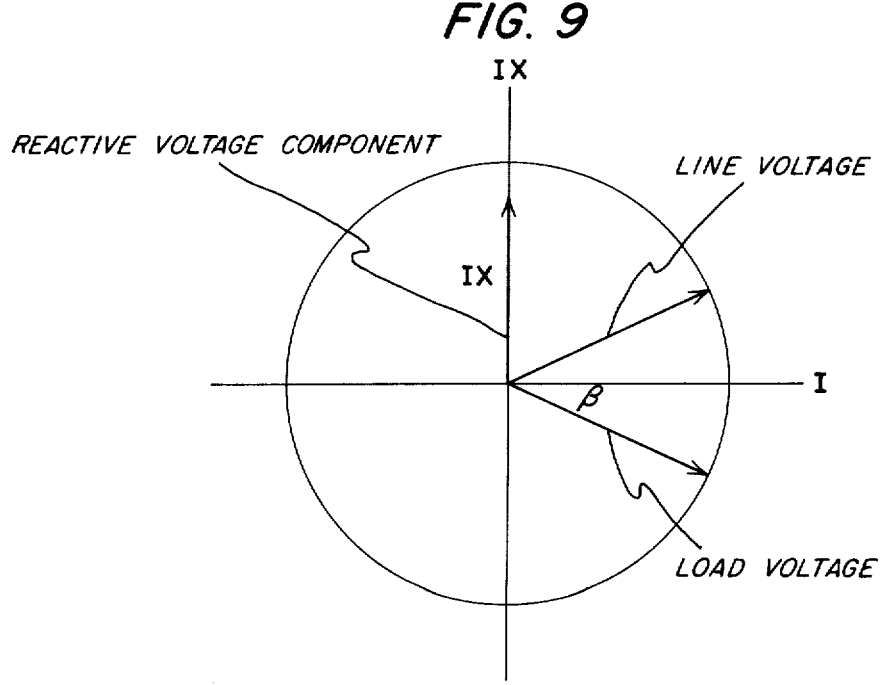
FIG. 9 is a vector representation of the relationship among the various voltages and currents of the compressor.
Figure 10:
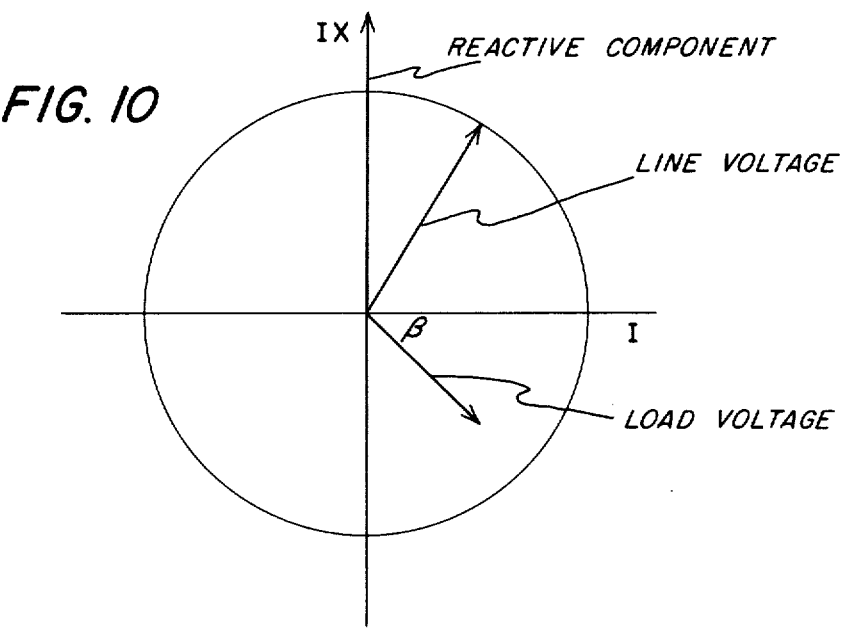
FIG. 10 is another vector representation of the relationship among the various voltages and currents of the compressor.

Referring now to FIGS. 9 and 10 the line voltage is represented by a vector terminating on a constant radius circle. The first voltage will not be considered as it is relatively small and the principles to be considered here are equally well understood without it. The second voltage is represented by the vector IX. The third voltage is represented by the indicated load voltage vector.

Consider the load voltage. It can be described generally by the equation:

$$\epsilon = \beta l v$$

wherein $\beta$ is the flux of the magnetic field which links and unlinks the coil, $l$ is the effective length of the coil in the field, and $v$ is the relative velocity of the coil and field.

Consider now the effect of a perturbation in the stroke resulting in an overstroke. As has been indicated, overstroking results in a decrease in the spring constant of the system, and a consequent decrease in the natural frequency. Since the frequency of the driving voltage is invariate, an off resonant condition results and the amplitude of the stroke should be reduced. A second consequence of the increased stroke must be considered however. The reduction in natural frequency of the mass spring system will result in a lag of velocity of the mass with reference to line voltage. This lag produces a similar lag of load voltage. Referring now to FIG. 10, it will be noted that an increased lag of load voltage, represented by an increase in angle B over that shown in FIG. 9 will result in an increase in the IX voltage which it is recalled must, in combination with the load voltage equal the line voltage. Since the driving force of an electrodynamic linear motor is proportional to the current, and since the IX voltage is the product of a fixed reactance with the current, an increase in magnitude of IX represents a corresponding increase in current and thus in driving force. It can be seen then that a perturbation which causes overstroking will tend to increase itself, rather than damping out.

The combination of these two phenomena, off resonant decrease in amplitude, and increase in driving force resulting from overstroke, tend to oppose each other. I have discovered that the decrease in amplitude due to off resonant operation has been more than compensated for by the increase in amplitude due to the electrodynamic linear motor. The present invention provides a solution to this inherent instability.

While the present invention may take many forms, consideration of a specific form of variable stiffness spring will aid in comprehension of the novel features of the invention.

In one embodiment of the invention a variable stiffness gas spring is provided having ports adapted upon overstroking, to admit additional fluid into the gas spring cylinder to increase the natural frequency of the mechanical system and thus to oppose overstroking. Second ports are provided to create a centering force lacking in conventional gas springs, and to equalize the increase in stiffness created by the operation of the end of stroke ports.

Upon overstroking the stiffness of the resonant system tends to decrease due to the reduction in stiffness of the spring restoring force provided by the valved working cylinder. If uncorrected, this descrease in frequency produces an increase in the angle through which displacement lags driving force, and a commensurate increase in the angle through which the load voltage lags the current. This increase in lag of load voltage behind current cause an increase in the reactive voltage of the motor and an increase in current and therefore in driving force.

The invention opposes this action by admitting additional fluid to the gas spring cylinder of the piston in the overstroked position. At the subsequent midstroke porting position the pressure in the two gas springs equalizes at a higher value than before overstroking. This increase is of sufficient magnitude to counter the drop in stiffness of the valved working cylinders and therefore raise the resonant frequency of the mechanical system. The raised resonant frequency decreases the angle through which displacement of the piston lags the driving force, and consequently decreases the angle through which the load voltage lags the current. This causes a decrease in reactive voltage IX with a corresponding decrease in the current I, which in turn results in a reduction in driving force. Thus the overstroking is controlled.

Figure 11:
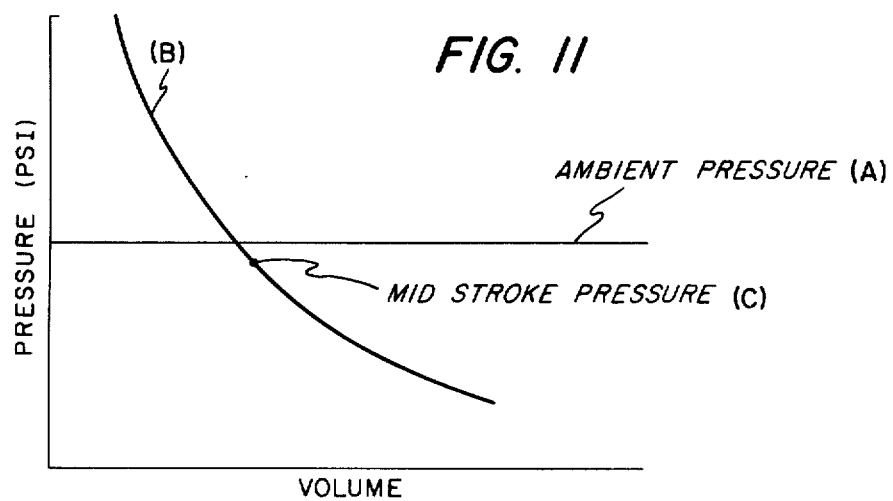
FIG. 11 is a graphical representative of a gas spring operating curve for a particular ambient pressure showing the midstroke pressure.

Referring now to FIG. 11, the ambient pressure in the compressor is indicated (A) as is the locus of adiabatic pressure volume parameters for the gas spring cylinder (B). Normally the conditions in the gas spring cylinder at midstroke (C) will be somewhat below the ambient pressure (A). This is due to the fact that the cylinder-piston combination does not form a perfect seal. When the pressure in the cylinder exceeds ambient pressure, as during compression, gas will leak from the cylinder, when the ambient pressure exceeds the cylinder pressure, as during decompression, gas will leak into the cylinder. In the steady-state condition, the sum of these leakages will be zero. The rate of leakage is proportional to the pressure differential and since the slope of the pressure-volume curve is monotonically decreasing as the volume decreases, the volume of leakage during compression will be greater than during decompression. For this reason the pressure at midstroke will fall below the ambient pressure.

Under certain operating conditions the overstroking compensation will occur continuously. Consider for example operation at an ambient pressure below the nominal value. Since the pressure in the working cylinders will ttend to be low, overstroking will occur, and porting will admit additional fluid to the gas spring cylinders increasing their stiffness. This is a normal mode of operation for low ambient pressure conditions. The design of the gas springs is such that the minimum pressure, occurring at the bottom dead center position is lower than the lowest expected ambient pressure. This allows effective porting even at low ambient pressures, allowing midstroke pressure to be maintained at the design value. The stiffness of the system is maintained at a value sufficient to maintain the natural resonant frequency at the value of the power line frequency and the stroke length and output of the compressor remain close to their design values.

Figure 12:
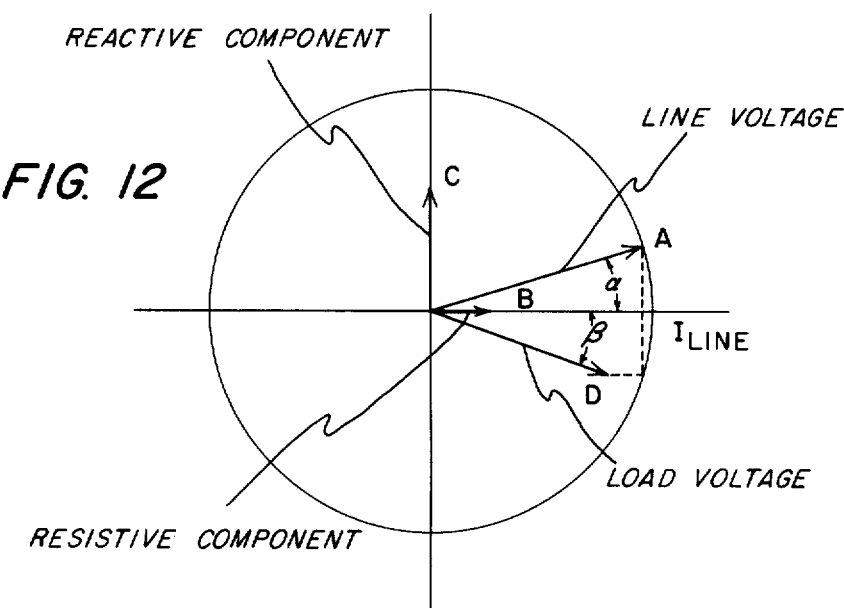
FIG. 12 is yet another vector representation of the relationship among the various voltages and currents of the compressor.

The present invention provides as an additional advantage over the prior art means for obtaining a nearly optimum power factor. FIG. 12 shows the vectorial relationships among the line voltage A, the IR drop B, the IX voltage C, and the load voltage D. The cosine of the angle $\alpha$ between the line voltage and the line current is conventionally defined as the power factor. The angle $\beta$ between the load voltage and the line current is dependent upon the variable stiffness gas spring, and is therefore subject to be determined in the design of the compressor. Preferably the angle $\alpha$ will be constrained to vary in the range of $-2°$ to $+25°$ in the particular embodiment of the invention illustrated. Note that since line voltage A is the sum of load voltage D, IR drop B and IX voltage C, and since the relative phases of the IR voltage and the IX voltage are relatively constant with respect to the line current, selection of the angle α will determine the angle β and therefore the power factor. While the power factor may be any desired value by the application of this invention, considerations of increased motor size make it preferable that the power factor be limited to about 0.9.

Although there has been described herein what is considered at present to be the preferred embodiments of the invention, many modifications and changes may occur to those skilled in the art. Therefore, it is intended that the appended claims cover all such modifications and changes as fall within the true spirit and scope of the invention.

What we claim and desire to secure by Letters Patent of the United States is:

1. A compressor comprising:
   a. an electrodynamic motor adapted to be driven cyclically by an AC power source;
   b. a piston coupled to and adapted to be driven within a selectively valved working cylinder by said motor substantially in synchronism with said power source;
   c. enclosed volumes of gas acting as resilient means coacting with said piston and with said motor to form a mechanical resonant system having a resonant frequency approximately equal to the frequency of said AC power source; and
   d. means responsive to the position of said piston for controlling the force output of said motor to provide stable operation over varying compressor load conditions by varying the resonant frequency of said resonant system, increasing said resonant frequency in response to increasing piston stroke, and decreasing said resonant frequency in response to decreasing piston stroke, said means including first means communicating said enclosed volumes of gas with each other at an intermediate stroke position of said piston through a volume whose pressure is determined by the pressure of said enclosed volumes of gas to equalize the gas pressures in said enclosed volumes during operation and second means communicating one of said enclosed volumes of gas with a reservoir of gas at higher pressure whenever said piston exceeds a predetermined stroke position so that fas flows from said reservoir into said enclosed volume increasing the gas pressure therein and effecting an increase in the stiffness of the resilient means and thereby increasing the resonant frequency of said mechanical resonant system.

2. The compressor recited in claim 1 wherein the stiffness of said resilient means is varied during the cycle of operation of said mechanical resonant system subsequent to the cycle during which the change in piston stroke occurs.

3. A stable, gas spring resonant piston compressor contained within a hermetically sealed housing adapted to contain a fluid comprising:
   a. two pairs of cylinders, a working cylinder and a gas spring cylinder in each pair, the pairs being disposed generally opposite each other;
   b. two substantially hollow pistons, each having two plungers freely reciprocable in said cylinders and cooperating therewith for the compression of fluid therein;
   c. two manifold-cylinder heads including valve means operative to direct unpressurized fluid to said working cylinders, and to exhaust pressurized fluid therefrom;
   d. an electrodynamic linear motor including an armature and a stator generally centered between said pistons, the armature of which is adapted to receive said pistons one on each end for rigid attachment thereto so that a unitary assembly is formed which is reciprocally driven by said motor;
   e. means intercommunicating the interiors of said hollow pistons; and
   f. porting means communicating said gas spring cylinders with the interiors of their respective hollow pistons at midstroke, so that the gas spring cylinders are intercommunicated and the pressures therein are equalized, and communicating said gas spring cylinders with a reservoir of pressurized fluid when said pistons are in the overstroked, bottom dead center portions, so that pressurized fluid flows into said gas spring cylinders increasing the pressure therein on subsequent strokes.

4. The compressor recited in claim 3 wherein said means intercommunicating the interiors of said hollow pistons comprises a passage through said armature.

5. The compressor recited in claim 3 wherein said porting means comprises:
   a. two annular cavities containing pressurized fluid generally located between the stator of said electrodynamic linear motor, and the outside walls of said pistons;
   b. an annular groove in the wall of said gas spring cylinders;
   c. a first plurality of circumferentially spaced apart fluid passages communicating said gas spring cylinders with said annular groove when said pistons are at midstroke and communicating said gas spring cylinders with said annular cavities when said pistons are in the overstroked, bottom dead center positions, so that pressurized fluid flows into said gas spring cylinders; and
   d. a second plurality of circumferentially spaced apart fluid passages communicating said hollow piston interiors with said annular groove at midstroke so that said gas spring cylinders are communicated with each other at midstroke and the pressures therein are equalized.

* * * * *